US010829151B2

(12) United States Patent
Schiebahn et al.

(10) Patent No.: US 10,829,151 B2
(45) Date of Patent: Nov. 10, 2020

(54) METHOD FOR DIFFERENTIATING DRIVER INPUT

(71) Applicant: Ford Global Technologies, LLC, Dearborn, MI (US)

(72) Inventors: Michael Schiebahn, Bornheim (DE); Peter W. A. Zegelaar, Heerlen (NL); Helmuth Bosch, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 15/801,620

(22) Filed: Nov. 2, 2017

(65) Prior Publication Data

US 2018/0118263 A1 May 3, 2018

(30) Foreign Application Priority Data

Nov. 3, 2016 (DE) .................. 10 2016 221 565

(51) Int. Cl.
 B62D 15/02 (2006.01)
 B62D 1/28 (2006.01)
 (Continued)

(52) U.S. Cl.
 CPC ........... *B62D 15/025* (2013.01); *B60W 30/10* (2013.01); *B62D 1/286* (2013.01); *B62D 15/021* (2013.01);
 (Continued)

(58) Field of Classification Search
 CPC .. B62D 15/025; B62D 15/021; B62D 15/024; B62D 1/286; B60W 30/10; B60W 50/10; B60W 2540/18
 (Continued)

(56) References Cited

U.S. PATENT DOCUMENTS 5,276,620 A 1/1994 Bottesch
5,448,482 A * 9/1995 Yamamoto ........... B62D 5/0466
 180/446

(Continued)

FOREIGN PATENT DOCUMENTS

DE 102014208785 A1 11/2015
DE 102015119706 A1 * 5/2016 ............. F02D 37/02
 (Continued)

OTHER PUBLICATIONS

Lefevre, S. et al, A Survey on Motion Prediction and Risk Assessment for Intelligent Vehicles, Jul. 23, 2014.
(Continued)

*Primary Examiner* — Tuan C To
(74) *Attorney, Agent, or Firm* — Raymond L. Coppiellie; Burgess Law Office, PLLC

(57) ABSTRACT

A method for distinguishing intentional steering movements of a driver for influencing an intentional driving path of a motor vehicle from corrective steering movements of the driver as a reaction to unexpected deviations of the motor vehicle from the intentional driving path including ascertaining an instantaneous undisturbed motion of the vehicle along the driving path and calculating a reference value for a steering angle (SAR) corresponding to the ascertained, undisturbed motion of the motor vehicle or a reference value for a steering velocity (SVR) corresponding to the ascertained, undisturbed motion of the motor vehicle. Comparing the reference value(s) (SAR; SVR) with instantaneous steering-angle values (SA(t)) or instantaneous steering-velocity values (SV(t)) and ascertaining whether a difference between the instantaneous steering-angle value (SA(t)) and the corresponding reference steering-angle value (SAR) or a difference between the instantaneous steering-velocity value (SV(t)) and the corresponding reference steering-velocity value (SVR) exceeds a predetermined error-limit value (ΔE)

(Continued)

which is established for the calculation of the reference values (SVR; SAR). If so, determining it is a corrective steering movement of the driver as a reaction to an unexpected deviation of the motor vehicle from the intentional driving path.

16 Claims, 2 Drawing Sheets

(51) Int. Cl.
  *B60W 30/10* (2006.01)
  *B60W 50/10* (2012.01)
(52) U.S. Cl.
  CPC ........... *B62D 15/024* (2013.01); *B60W 50/10* (2013.01); *B60W 2540/18* (2013.01)
(58) Field of Classification Search
  USPC .......................................................... 701/41
  See application file for complete search history.

(56) References Cited

U.S. PATENT DOCUMENTS

| | | | |
|---|---|---|---|
| 5,528,497 A | 6/1996 | Yamamoto et al. | |
| 5,845,222 A * | 12/1998 | Yamamoto | B62D 5/0472 701/41 |
| 6,112,845 A * | 9/2000 | Oyama | B62D 5/0463 180/443 |
| 7,360,614 B2 | 4/2008 | Yokote | |
| 9,994,251 B2 * | 6/2018 | Chang | B62D 6/008 |
| 10,131,377 B2 * | 11/2018 | Minaki | B62D 15/027 |
| 10,144,448 B2 * | 12/2018 | Minaki | B62D 6/00 |
| 10,246,128 B2 * | 4/2019 | Kojo | B62D 5/008 |
| 2008/0006699 A1 | 3/2008 | Fujita et al. | |
| 2008/0147249 A1 | 6/2008 | Kuge et al. | |
| 2009/0024279 A1 * | 1/2009 | Takeda | B60W 50/16 701/41 |
| 2009/0248250 A1 * | 10/2009 | Yasui | B62D 6/003 701/42 |
| 2012/0109461 A1 | 5/2012 | Nitta et al. | |
| 2013/0060413 A1 | 3/2013 | Lee et al. | |
| 2013/0197713 A1 * | 8/2013 | Yoshihama | B60W 50/10 701/1 |
| 2014/0081525 A1 | 3/2014 | Itamoto et al. | |
| 2014/0222295 A1 | 8/2014 | Dornhege et al. | |
| 2015/0066305 A1 * | 3/2015 | Kodera | B62D 5/0463 701/43 |
| 2015/0066306 A1 * | 3/2015 | Kodera | B62D 5/0463 701/43 |
| 2015/0226627 A1 * | 8/2015 | Kuwahara | B62D 6/10 701/41 |
| 2015/0239492 A1 * | 8/2015 | Yukitake | B62D 5/049 701/43 |
| 2015/0336608 A1 | 11/2015 | Burcar et al. | |
| 2017/0088166 A1 * | 3/2017 | Kunihiro | B62D 5/0463 |
| 2017/0129535 A1 * | 5/2017 | You | B62D 6/002 |

FOREIGN PATENT DOCUMENTS

| | | | |
|---|---|---|---|
| JP | 3731997 B2 * | 1/2006 | |
| JP | 2011221866 A | 11/2011 | |
| JP | 2013129351 A * | 7/2013 | |
| JP | 5294055 B2 * | 9/2013 | |
| JP | 2014102537 A * | 6/2014 | |
| JP | 5688809 B2 * | 3/2015 | |

OTHER PUBLICATIONS

Lethaus, F. et al, "Using Pattern Recognition to Predict Driver Intent," Apr. 2011.

* cited by examiner

METHOD FOR DIFFERENTIATING DRIVER INPUT

CROSS-REFERENCE TO RELATED APPLICATIONS

Not Applicable.

BACKGROUND OF THE INVENTION

1. Field of the Invention

A method for distinguishing intentional steering movements of a driver for influencing an intentional driving path of a motor vehicle from corrective steering movements of the driver as a reaction to unexpected deviations of the motor vehicle from the intentional driving path.

2. Description of Related Art

Modern vehicles are provided with actuators which, in principle, support driver input, including operating movements and/or operating forces, or intervene in a supportive manner to assist the driver with vehicle operation.

In certain operational situations of a vehicle, for example, braking on a roadway having varying coefficients of friction, during a braking operation the vehicle undertakes an unintentional and unexpected deviation from the intentional driving path. Such deviations caused in part by pavements having varying coefficients of friction, for example, a roadway that is damp or wet on one side or, for example, in the case of a roadway frozen on one side. In principle, any driving situation is affected in which the wheels on one side of the vehicle have a frictional contact with the roadway that differs regarding the coefficient of friction μ from the roadway contact of the wheels on the other side of the vehicle.

When a vehicle decelerates on a roadway surface having different coefficients of friction on each side of the vehicle, a yawing moment or torque about the vertical axis of the vehicle, arises because of differing magnitudes of the braking forces generated on the right and left sides of the vehicle. Such a yawing moment gives rise to a vehicle motion, in particular, yawing or turning of the vehicle, toward that side of the roadway surface having a higher coefficient of friction compared to the other side of the roadway surface.

Because the vehicle yaws or turns it departs from the driving path intended by the driver in an unexpected and often unintentional manner. To compensate for such a yawing or turning of the vehicle, the driver reacts by turning the steering wheel to steer the vehicle in the opposite direction, as a reaction to the yawing motion of the vehicle, to return the vehicle back to the intentional driving path.

These countersteering operations of the vehicle often happen in a reflex-like manner and consequently very quickly. Particularly, with experienced drivers. However, in such a situation the current steering does not match the intended and intentional driving path on which the vehicle should move without the influence of the yawing moment.

In such a case, a conventional driver-support system, designed to support driver input, such as the operating movements or operating forces of the driver, brings about a countersteering support, which, may lead to excessive countersteering, potentially creating an oversteer situation.

With existing steering-assistance systems it may be difficult to distinguish the steering movements of the driver; specifically, whether the intended steering movements of the driver are for the intended influencing of the driving path of the vehicle, or whether they are, where appropriate, reactive or reflex-like countersteering movements in order to bring the vehicle, turning or swinging out or threatening to swing out, back to the intentional driving path. The steering velocity may be an unsuitable criterion, because with an evasive maneuver, for example, swerving in relation to an obstacle suddenly arising, such as an animal on the roadway, it is also necessary to perform very fast and reflex-like steering movements. Such an evasive steering movement leads to an intentional alteration of the driving path, namely around the suddenly appearing obstacle. In the course of such fast steering movements occurring in the manner described above, it is desired, where appropriate, that a support by the steering-assistance or steering-support system of the vehicle takes place.

In order to provide a correct intervention of the steering support system, it is necessary to distinguish reflex-like countersteering movements from intentional, fast steering movements. Such a distinction is difficult for existing systems.

SUMMARY OF THE INVENTION

A method for differentiating driver input including determining an instantaneous non-perturbation vehicle state on an intentional driving path and calculating a steering signal reference value based on the non-perturbation vehicle state. The method compares the steering signal reference value with an instantaneous steering signal value to determine any difference between the two. When the difference exceeds a predetermined value a determination is made that the driver input is a reaction to an unexpected deviation from the intentional driving path.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
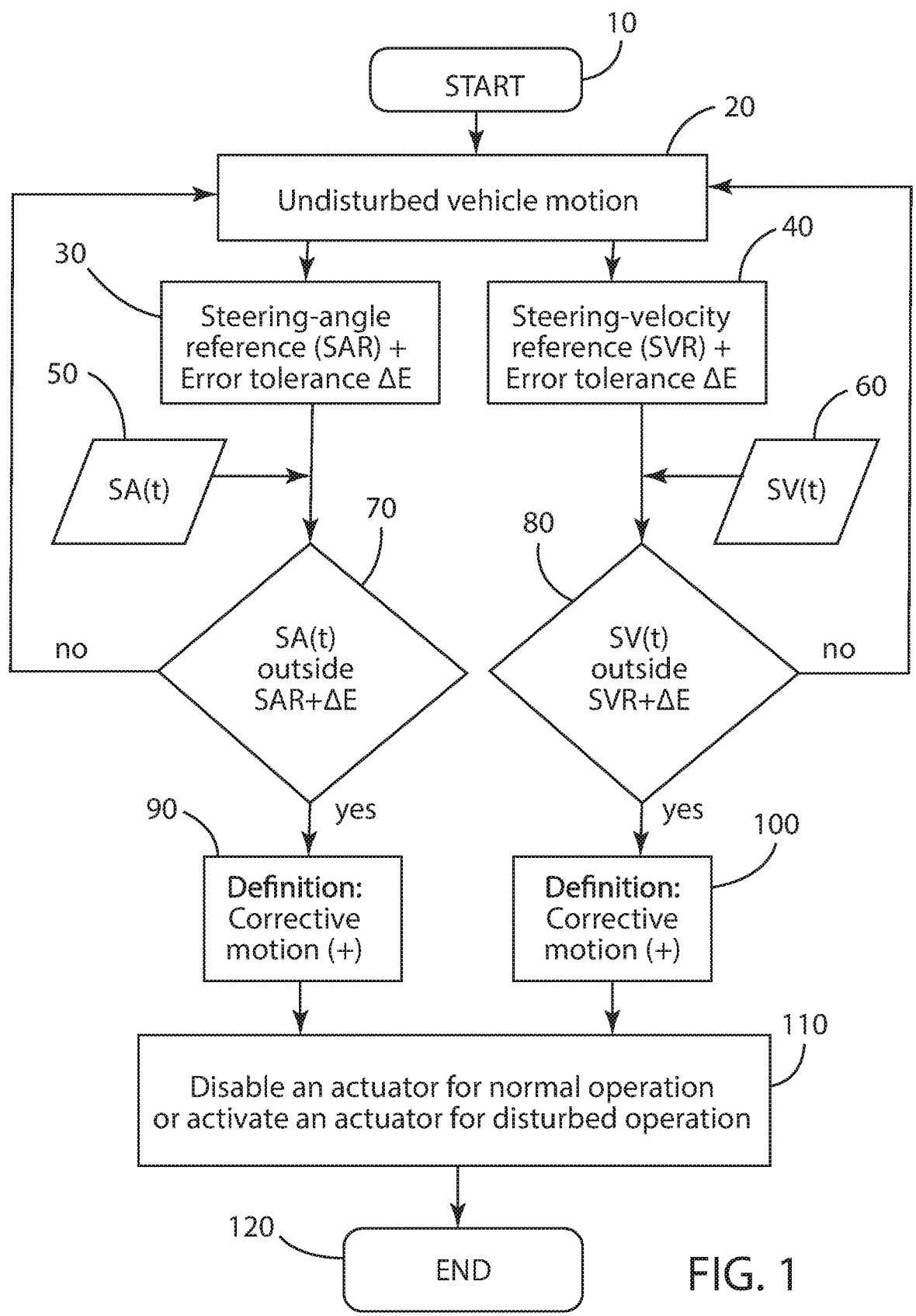
FIG. 1 is a schematic flow chart showing a first embodiment of the method according to the invention.

FIG. 1 illustrates a first embodiment of the invention schematically. The method starts with step 10 and moves to step 20 wherein based on vehicle operating parameters the method determines an undisturbed vehicle motion, course, or state. The undisturbed vehicle state also includes or may be described as a non-perturbation vehicle state, wherein the term perturbation is a disturbance of motion, course, arrangement, or state of equilibrium. While the vehicle is operating with an undisturbed vehicle motion, course or state, the method, as part of steps 30, 40 determines or ascertains a reference value, corresponding to the undisturbed vehicle motion, for a steering angle SAR and for the steering velocity SVR.

"Steering angle SA" is the angle, starting from an initial position, the steering wheel of a vehicle rotates about its steering axis. The steering angle SA may also be a lock angle of a wheel the latter has in comparison with the straight-ahead position. In each instance, the time derivative of aforementioned quantities for the steering angle is to be understood as the steering velocity. The "steering velocity SV" is the angular velocity of the steering wheel or of a wheel of the wheel suspension system of the vehicle.

Consequently, a reference value for the steering angle SAR or a reference value for a steering velocity SVR available, individually or at the same time. These quantities are representative of an undisturbed vehicle motion traveling along a driving path of the vehicle. Furthermore, in steps 50, 60 the current steering angle SA(t) and also the current steering velocity SV(t) are constantly determined or ascertained. The ascertainment of the reference values is undertaken using an inverse vehicle model, in which connecting the associated steering angles and steering velocities can be inferred from the undisturbed or no-perturbation vehicle motion. With an inverse vehicle model, the equations are inverted wherein a response quantity is specified as an input and a new set of equations is solved yielding the steer angle required as an output. The equations provide an input steer angle needed to perform a specific maneuver for various vehicles.

As part of steps 30, 40 the steering-angle reference value SAR or steering-velocity reference value SVR is provided in each instance with an error-tolerance value ΔE. Next in steps 70, 80 the reference value for the steering angle SAR or a reference value for a steering velocity SVR along with the respective error tolerances ΔE are compared to the current steering angle SA(t) or of the current steering velocity SV(t) from steps 50, 60. If the current steering angle SA(t) or the current steering velocity SV(t) lie outside a range predetermined by the error-tolerance value ΔE, it is decided, in the case of a steering movement currently being performed by the driver and the steering angle SA(t) and the steering velocity SV(t) resulting from the steering movement performed by the driver, it is a corrective movement that does not match the undisturbed vehicle motion.

If so, the method moves to steps 90, 100 and a corrective movement or motion is positively detected, and in step 110 an actuator provided for normal operation of a motor vehicle for example, typically for further undisturbed motion of the vehicle along the intended driving path, is disabled. Alternatively, an actuator provided for disturbed operation may be activated.

If the current steering angle SA(t) and the current steering velocity SV(t) from steps 50, 60 are located within the respectively established ranges for the error-tolerance value ΔE, steps 70, 80, an undisturbed vehicle motion remains, in which case the actuator for undisturbed vehicle operation remains active. As shown with the embodiment of FIG. 1, it is sufficient if either the steering angle SA(t) or the steering velocity SV(t) lie outside the error-tolerance range ΔE in order to output a definition wherein a corrective movement or motion is obtained and the movement consequently leads, where appropriate, to the disabling of the actuator. In an alternative embodiment it may be that the definition of a corrective movement of the driver is output only when both the instantaneous steering angle SA(t) and the instantaneous steering velocity SV(t) exceed the associated limiting values of the error tolerance ΔE. In such a case, in contrast to FIG. 1, the two conditions would accordingly have to occur cumulatively. Such a configuration also lies within the scope of the invention.

Figure 2:
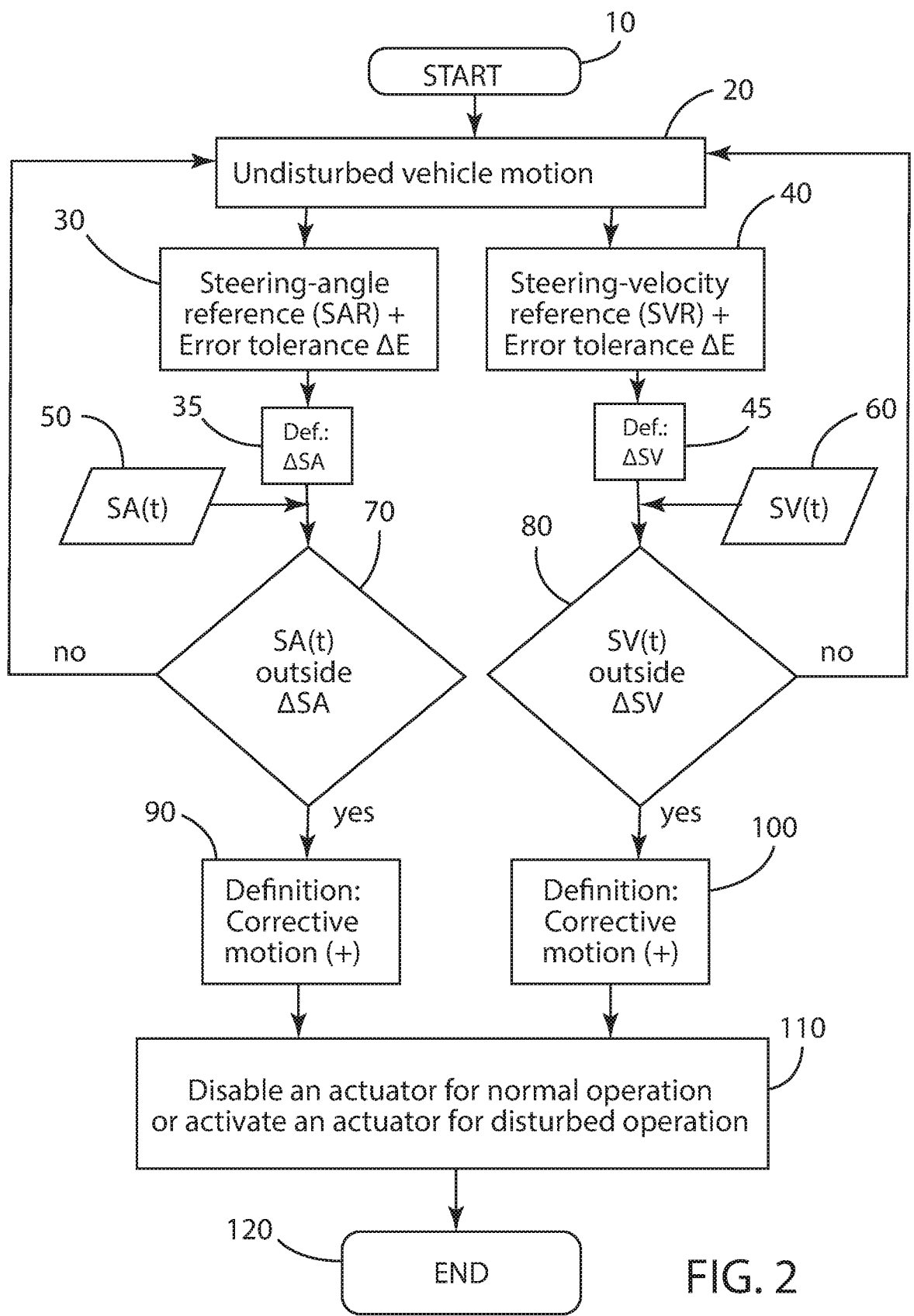
FIG. 2 is a schematic flow chart showing a second embodiment of the method according to the invention.

FIG. 2 shows another exemplary embodiment of the invention, wherein the reference values for the steering angle SAR or for the steering velocity SVR are supplemented based on a certain permissible bandwidth for the steering angle ΔSA or for the steering velocity ΔSV. The bandwidths for the steering angle, the steering velocity ΔSA, or ΔSV are established in such a way they cover all possible steering movements and/or steering velocities that lead to an undisturbed vehicle motion or are conceivable for an undisturbed vehicle motion.

In this embodiment the current steering angle SA(t) or the current steering velocity SV(t) are compared with the predefined bandwidths ΔSA and ΔSV, respectively in steps 75, 85. If the current steering angle SA(t) lies outside the bandwidth of permissible steering angles ΔSA, or the steering velocity SV(t) lies outside the bandwidth ΔSV, it is a corrective movement. On the basis of this decision, an actuator is then disabled, for example, in normal operation of the vehicle, the case of undisturbed vehicle motion, the actuator supports the steering movement of the driver. Alternatively, an actuator can be activated via a driver-assistance device that has been designed especially for disturbed or perturbation vehicle state.

In comparison with the first embodiment of the invention, the additional predefined bandwidths ΔSA and ΔSV are taken into consideration, over and above the error tolerance ΔE in connection with the ascertainment of the instantaneous driving path, whereby further possible alterations of the current steering velocity SV(t) or of the current steering angle SA(t) may occur that still pertain to normal operation of the vehicle and do not yet represent an unexpected deviation of the motor vehicle from the intentional driving path. In the course of the ascertainment of bandwidths ΔSA and ΔSV it can, for example, be taken into consideration that, where appropriate, on the left and right sides of the vehicle differing tire pressure is present which, in comparison with the ascertained reference value SAR and SVR, may lead to deviating instantaneous steering angles SA(t) and steering velocities SV(t) without this being attributable to a calculation error or uncertainty error in the ascertainment of the intentional driving path.

The method consequently takes into consideration at least one error tolerance ΔE in the ascertainment of the desired and intentional driving path of the vehicle. In addition, in an exemplary embodiment of the invention an extended bandwidth range for the steering angle ΔSA and for the steering velocity ΔSV can also be established, which take into consideration other irregularities of the vehicle and/or of the driving situation that cannot be captured with the model-based or inverse vehicle model computational determination of the intentional driving path.

The reference values for the steering angle SAR, and for the steering velocity SVR, use vehicle operation signals ascertained by sensors already present in the vehicle that are used with other systems. Such signals may be, for example, associated with one or more of the vehicle states ascertained by existing vehicle sensors such as: longitudinal acceleration of the vehicle along its longitudinal axis; transverse acceleration of the vehicle along a transverse axis of the vehicle; vertical acceleration of the vehicle along a vertical axis of the vehicle; longitudinal velocity; transverse velocity; vertical velocity; yaw velocity; sway velocity; roll velocity; yaw acceleration; sway acceleration; roll acceleration; and wheel speeds and/or wheel accelerations of individual wheels or of several wheels of the motor vehicle.

The values of the instantaneous steering angle SA(t) and/or of the instantaneous steering velocity SV(t) may be obtained from steering sensors or steering-angle sensors used to ascertain a steering angle SA or a steering velocity SV of the steering wheel about the steering axis thereof or the corresponding angles/speeds in respect of a wheel to be steered.

The disclosed method makes it possible to distinguish, in an advantageous manner, between a steering movement intended by the driver for the purpose of altering a desired driving path, and steering movements arising as a reaction to an unintentional alteration of the driving path of the vehicle. An essential distinction for assistance systems, such as a steering actuator, that are disabled upon detection of a countersteering movement, often occurring quickly and in a reflex-like manner, or for enabling or activating actuators specially designed for special driving situations.

Accordingly, the method distinguishes intentional steering movements of a driver for influencing an intentional driving path of a motor vehicle from corrective steering movements of the driver as a reaction to unexpected deviations of the vehicle from the intentional driving path, the method making it possible to drive the steering-support system reliably and in a manner supporting the driver, as can be expected by the latter.

The method first ascertains an instantaneous, undisturbed motion of the vehicle along the intentional driving path. Afterward, in a first aspect of the invention at least one reference value for a steering angle corresponding to the ascertained, undisturbed motion of the motor vehicle or a reference value for a steering velocity corresponding to the ascertained, undisturbed motion of the motor vehicle is determined, the aforementioned determination undertaken using an inverse vehicle model. The reference value compared with instantaneous steering angle values or with instantaneous steering-velocity values.

The method ascertains whether a difference between the instantaneous steering-angle value and the corresponding reference steering-angle value or a difference between the instantaneous steering-velocity value and the corresponding reference steering-velocity value exceeds a predetermined error-limit value which, for example, is established in advance for the reference values obtained from the determination or calculation using an inverse vehicle model. If so, it is determined it is a question of a corrective steering movement of the driver as a reaction to an unexpected deviation of the motor vehicle from the intentional driving path.

If such, the intervention of an actuator, for example, a steering-aid actuator for normal operation, can be prohibited straightaway. When determined or ascertained that it is not a question of a corrective steering movement, in particular, not a reflex-like corrective steering movement of the driver, support of the steering actuator can be maintained or can be triggered and performed.

In one embodiment of the invention, after the ascertaining an instantaneous undisturbed motion of the vehicle along a driving path, in addition to the error-limit values, a definition is made that relates to predetermined bandwidths for absolute values of an instantaneous steering-angle value or to predetermined bandwidths for absolute values of an instantaneous steering-velocity value.

Furthermore, it is subsequently ascertained whether the absolute values of the instantaneous steering-angle value or of the instantaneous steering-velocity value lie outside the respectively corresponding, predetermined bandwidth, and if so, deciding that it is a question of a corrective steering movement, in particular a reflex-like corrective steering movement of the driver as a reaction to an unexpected deviation of the motor vehicle from the intentional driving path. In this case, where appropriate the supportive action of a steering actuator can then be prohibited or can be adapted appropriately to the driving situation.

In an exemplary embodiment of the method according to the invention, at least one driving-assistance system is deactivated if a corrective steering movement of the driver as a reaction to unexpected deviations of the motor vehicle from the intentional driving path is detected. The driver-assistance system may be, for example, a steering actuator and/or a brake actuator.

In another exemplary embodiment, input signals for the calculation of the reference value based on the at least one signal are calculated based on at least one state of the motor vehicle selected from the following group: longitudinal acceleration of the vehicle along its longitudinal axis; transverse acceleration of the vehicle along a transverse axis of the vehicle; vertical acceleration of the vehicle along a vertical axis of the vehicle; longitudinal velocity; transverse velocity; vertical velocity; yaw velocity; sway velocity; roll velocity; yaw acceleration; sway acceleration; roll acceleration; wheel speeds and/or wheel accelerations of individual wheels or of several wheels of the motor vehicle.

In another embodiment, a driver-assistance system can be activated a corrective steering movement of the driver as a reaction to unexpected deviations of the motor vehicle from the desired driving path is detected. Accordingly, where appropriate the driver can be positively supported in a critical driving situation as regards actions to be performed on the vehicle.

Such a driver-assistance system may be, for example, a driver-assistance system that is an assistance system for countersteering. Such a driving-assistance system for countersteering supports the driver in reacting to unexpected deviations of the motor vehicle from the desired driving path, the vehicle being guided further on the desired driving path or guided back to the desired driving path.

In another embodiment of the method, a plurality of reference values for the steering angle and/or for the steering velocity are stored, and in each instance a temporally last value of the reference value relating to the steering angle or to the steering velocity that matches an undisturbed driving path of the motor vehicle is used as reference value for the comparison with the instantaneous values of the steering angle or of the steering velocity.

With a temporally progressing and continual joint storage of values relating to the steering angle and/or to the steering velocity, it is possible in a straightforward manner to detect the last driving situation in which the steering angle and the steering velocity match the desired driving path, and consequently to establish it as a basis for comparison; that is reference values for the exemplary method.

In another embodiment, a determination of the values of the instantaneous steering angle and/or of the instantaneous steering velocity is undertaken as a function of at least one vehicle state, the vehicle state being selected from at least one of the groups listed in the following: wheel speeds and/or wheel accelerations of individual wheels or of several wheels of the motor vehicle; position of the steering wheel or of the steering column, which is ascertained by a steering sensor; angular velocity of the steering wheel about the steering axis of the steering column; position of at least one steering wheel with respect to the steering angle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for distinguishing intentional steering movements of a driver for influencing an intentional driving path of a motor vehicle from corrective steering movements of the driver as a reaction to unexpected deviations of the motor vehicle from the intentional driving path comprising the following steps:
    ascertaining an instantaneous undisturbed motion of the vehicle along the intentional driving path;
    calculating a reference value using an inverse vehicle model for a steering angle (SAR) corresponding to the ascertained, undisturbed motion of the motor vehicle or for a steering velocity (SVR) corresponding to the ascertained, undisturbed motion of the motor vehicle;
    comparing the reference value with an instantaneous steering-angle value (SA(t)) or an instantaneous steering-velocity value (SV(t));
    determining whether a difference between the instantaneous steering-angle value (SA(t)) and the corresponding reference steering-angle value (SAR) or between the instantaneous steering-velocity value (SV(t)) and the corresponding reference steering-velocity value (SVR) exceeds a predetermined error-limit value ($\Delta E$) established for the calculation of the reference values (SVR; SAR); and
    based on the difference exceeding the predetermined error-limit value ($\Delta E$) determining the corrective steering movement of the driver as a reaction to an unexpected deviation of the motor vehicle from the intentional driving path.

2. The method of claim 1 including establishing predetermined bandwidths ($\Delta SA$; $\Delta SV$) for absolute values of an instantaneous steering-angle value or an instantaneous steering-velocity value;
    determining whether the absolute values (SA(t)) of the instantaneous steering-angle value or the instantaneous steering-velocity value (SV(t)) lie outside the respectively corresponding, predetermined bandwidth ($\Delta SA$; $\Delta SV$); and
    based on the absolute value lying outside the predetermined bandwidth ($\Delta SA$; $\Delta SV$) determining the corrective steering movement of the driver as a reaction to an unexpected deviation of the motor vehicle from the intentional driving path.

3. The method of claim 1 wherein at least one driver-assistance system is deactivated upon determination of a corrective steering movement of the driver as a reaction to unexpected deviations of the motor vehicle from the desired driving path.

4. The method of claim 3 wherein the driver-assistance system is a steering actuator or a brake actuator.

5. The method of claim 1 wherein input signals for the calculation of the reference value (SAR; SVR) include one signal representing a state of the motor vehicle selected from the following group:
    longitudinal acceleration of the vehicle along its longitudinal axis; transverse acceleration of the vehicle along a transverse axis of the vehicle; vertical acceleration of the vehicle along a vertical axis of the vehicle; longitudinal velocity; transverse velocity; vertical velocity; yaw velocity; sway velocity; roll velocity; yaw acceleration; sway acceleration; roll acceleration; wheel speeds; and wheel accelerations of individual wheels or of several wheels of the motor vehicle.

6. The method of claim 1 including activation of a driver-assistance system upon detection of a corrective steering movement of the driver as a reaction to unexpected deviations of the motor vehicle from the desired driving path.

7. The method of claim 6 wherein the driver-assistance system is a countersteering assistance system supporting driver reaction to unexpected deviations of the motor vehicle from the desired driving path with the vehicle being guided on the desired driving path or back to the desired driving path.

8. The method of claim 1 including a plurality of stored reference values for the steering angle (SAR) or the steering velocity (SVR);
    using a temporally last value of the reference value relating to the steering angle (SAR) or the steering velocity (SVR) that matches an undisturbed driving path of the motor vehicle as reference value for the comparison with the instantaneous values of the steering angle ((SA(t)) or of the steering velocity (SV(t)).

9. The method of claim 1 including undertaking a determination of the values of the instantaneous steering angle (SA(t)) or the instantaneous steering velocity (SV(t)) based on a vehicle state selected from the following group:
    wheel speeds and/or wheel accelerations of individual wheels or several wheels of the motor vehicle; position of the steering wheel or the steering column, ascertained by a steering sensor, angular velocity of the steering wheel about the steering axis of the steering column; and position of at least one steering wheel with respect to the steering angle.

10. A method for differentiating driver input comprising:
    determining an instantaneous non-perturbation vehicle state on an intentional driving path;
    calculating a steering signal reference value based on the non-perturbation vehicle state;
    comparing the steering signal reference value with an instantaneous steering signal value to determine any difference;
    if a difference exceeds a predetermined error-limit value determining the driver input is a reaction to an unexpected deviation from the intentional driving path;
    establishing a predetermined bandwidth for an absolute value of an instantaneous steering-angle value;
    determining whether the absolute value of the instantaneous steering-angle value lies outside a respectively corresponding, predetermined bandwidth; and
    based on the absolute value lying outside the predetermined bandwidth determining the driver input is a reaction to an unexpected deviation of the motor vehicle from the intentional driving path.

11. A method for differentiating driver input comprising:
    determining an instantaneous non-perturbation vehicle state on an intentional driving path;
    calculating a steering signal reference value based on the non-perturbation vehicle state;
    comparing the steering signal reference value with an instantaneous steering signal value to determine any difference;
    if a difference exceeds a predetermined error-limit value determining the driver input is a reaction to an unexpected deviation from the intentional driving path;
    establishing predetermined bandwidths for an absolute value of an instantaneous steering-velocity value;

determining whether the absolute value of the instantaneous steering-velocity value lies outside the predetermined bandwidth; and based on the absolute value lying outside the predetermined bandwidth determining the driver input is a reaction to an unexpected deviation of the motor vehicle from the intentional driving path.

12. A method for differentiating driver input comprising:

determining an instantaneous non-perturbation vehicle state on an intentional driving path;

calculating a steering signal reference value based on the non-perturbation vehicle state;

comparing the steering signal reference value with an instantaneous steering signal value to determine any difference; and if a difference exceeds a predetermined error-limit value determining the driver input is a reaction to an unexpected deviation of the motor vehicle from the intentional driving path; and wherein calculating a steering signal reference value based on the non-perturbation vehicle state includes using an input signal based on a vehicle operating parameter selected from the following group:

longitudinal acceleration of the vehicle along its longitudinal axis; transverse acceleration of the vehicle along a transverse axis of the vehicle; vertical acceleration of the vehicle along a vertical axis of the vehicle; longitudinal velocity; transverse velocity; vertical velocity; yaw velocity; sway velocity; roll velocity; yaw acceleration; sway acceleration; roll acceleration; wheel speeds; and wheel accelerations of individual wheels or of several wheels of the motor vehicle.

13. A method for differentiating driver input comprising:

determining an instantaneous non-perturbation vehicle state on an intentional driving path;

calculating a steering signal reference value based on the non-perturbation vehicle state;

comparing the steering signal reference value with an instantaneous steering signal value to determine any difference; and if a difference exceeds a predetermined error-limit value determining the driver input is a reaction to an unexpected deviation of the motor vehicle from the intentional driving path; and wherein calculating a steering signal reference value based on the non-perturbation vehicle state includes using a temporally last value of the steering signal reference value relating to a steering value corresponding to an instantaneous non-perturbation vehicle state on an intentional driving path as steering signal reference value for the comparison with the instantaneous steering signal value.

14. The method of claim 13 wherein at least one driver-assistance system is deactivated upon determining driver input is a reaction to unexpected deviations of the motor vehicle from the desired driving path.

15. The method of claim 13 including activation of a driver-assistance countersteering system supporting driver input to unexpected deviations from the desired driving path to maintain the vehicle on the desired driving path.

16. The method of claim 13 including determining the instantaneous steering signal value based on a vehicle operating parameter selected from the following group:

wheel speeds and/or wheel accelerations of individual wheels or several wheels of the motor vehicle; position of the steering wheel or the steering column, ascertained by a steering sensor, angular velocity of the steering wheel about the steering axis of the steering column; and position of at least one steered wheel with respect to the steering angle.

* * * * *